AUTOMATIC TELEPHONE DIALING APPARATUS
Original Filed April 17, 1964 3 Sheets-Sheet 1
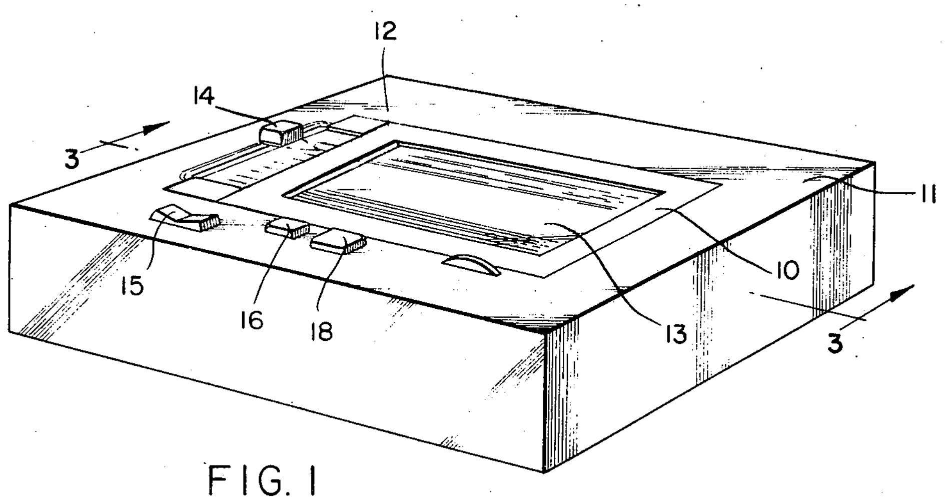
FIG. 1
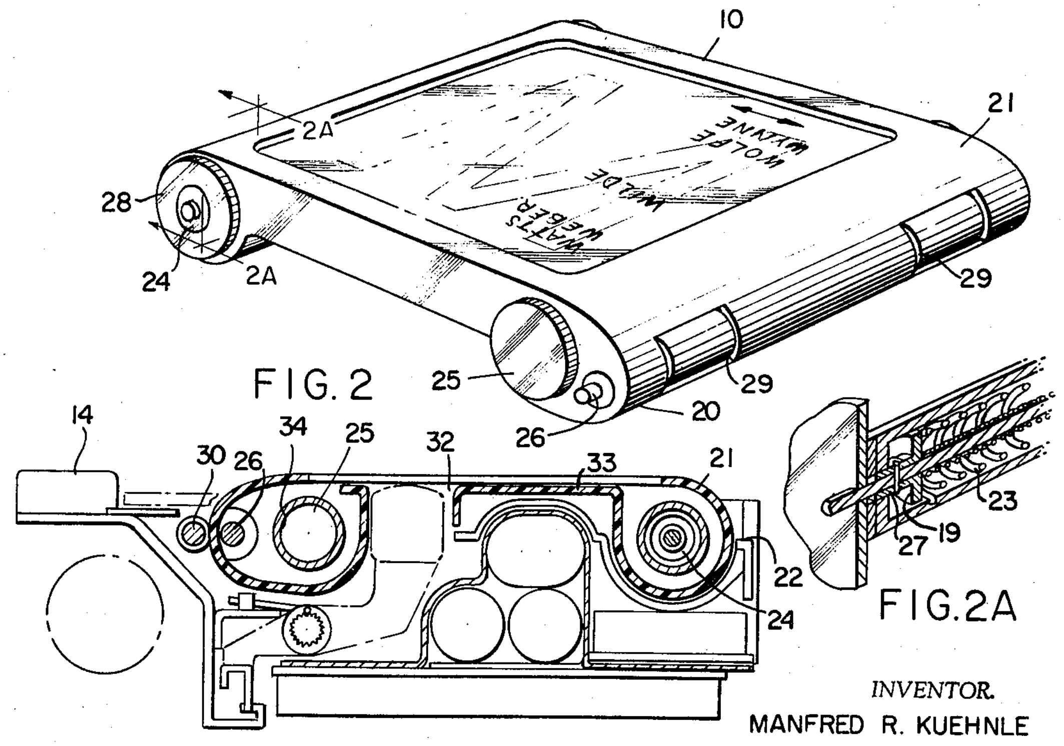
FIG. 2, FIG. 2A
FIG. 3
INVENTOR.
MANFRED R. KUEHNLE

AUTOMATIC TELEPHONE DIALING APPARATUS

Original Filed April 17, 1964 3 Sheets-Sheet 2

INVENTOR.
MANFRED R. KUEHNLE

AUTOMATIC TELEPHONE DIALING APPARATUS

Original Filed April 17, 1964 3 Sheets-Sheet 3

INVENTOR.
MANFRED R. KUEHNLE

United States Patent Office 3,495,229
Patented Feb. 10, 1970

3,495,229

AUTOMATIC TELEPHONE DIALING APPARATUS

Manfred R. Kuehnle, Lexington, Mass., assignor, by mesne assignments, to Dasa Corporation, a corporation of Massachusetts Continuation of application Ser. No. 360,609, Apr. 17, 1964. This application Feb. 14, 1968, Ser. No. 705,560
Int. Cl. G11b *5/00;* H04m *1/26*
U.S. Cl. 340—174.1 20 Claims

ABSTRACT OF THE DISCLOSURE

A data storage system especially useful in automatic telephone dialing systems and employing a cartridge loaded tape having data recorded longitudinally in groups along the length of the tape, in magnetic form on one surface of the tape and in visual form on an opposite surface of the tape. A reversible two-speed tape transport mechanism is provided to selectively drive the tape in a forward or reverse direction at a relatively rapid rate when scanning for a selected address, and to drive the tape in a forward direction at a controlled slower rate past a stationary read-write head when writing data into or reading data from the tape.

This application is a continuation of Ser. No. 360,609, filed April 17, 1964 and now abandoned.

This invention relates in general to magnetic tape storage devices and more particularly to a data storage device using magnetic tape in which the address positions are located visually.

Magnetic tape storage systems are a well-known form of data storage and usually include a reel of tape suitable for magnetic coding together with a take-up reel, a magnetic read and write head, and some address system for locating a particular piece of information stored on the tape. One method for locating the proper address consists in supplying the tape with a portion on which the address information can be entered so that it is visually readable. In order to read out a particular piece of information with this type of system, a search mode is first initiated in which the visually available address information is scanned and, once the address is located in this fashion, the magnetic information is then read out by the read-write head. In the past storage systems of this type have utilized longitudinal positions along the tape as the address locations with the magnetic information storage on transverse lines across the width of the tape. In the search mode, the tape was run longitudinally until the proper address was visually located, and then the read-write head was scanned transversely across the width of the tape to read out the stored information.

There are, however, some problems associated with such systems. Thus, each address line must have a provision for a precise registration with the read out head and also two separate mechanisms for motion are required, one being the mechanism for scanning the tape longitudinally, while the second mechanism is required to move the read-write head transversely at a controlled speed across the tape. In addition to the above mechanical requirements, such a system also imposes limitations on the type of data which may be stored and one the amount of data which may be read out in a given amount of time. Thus, for a single address line the length of the magnetic data record is limited to the transverse width of the magnetic portion of the tape. Also, readout of more than one address line at a time is rendered difficult since there is some curvature of the tape in its path from the storage to the take-up spool.

It is, therefore, a primary object of the present invention to provide a magnetic data storage system with each address position visually locatable, in which each address position has both a longitudinal and transverse coordinate and in which the data is encoded in lines which extend longitudinally along the data storage tape.

It is another object of the present invention to provide a magnetic data storage system in which the tape is moved in the same direction for both search scanning and readout and in which the read-write head remains stationary during readout of stored data or entry of data into storage.

It is still another object of the present invention to provide a magnetic data storage system having visual address locations in which the same motor provides the tape motion for address location in the search mode and also the tape motion for readout of the stored data in the readout mode.

Broadly speaking, the data storage system of this invention provides a data storage tape in which the visual address information is arranged in groups of words or names running longitudinally rather than transversely along the tape. The magnetic portion of the data is also stored lengthwise in each group. In order then to locate the proper address the tape is scanned rapidly longitudinally until the right group is reached and then a second transverse scan must be made to locate the proper line in the group. In the usual situation, the number of groups constituting the longitudinal addresses would greatly exceed the number of transverse lines in any one group. Typically each group might consist of addresses beginning with the same letter of the alphabet, and hence by marking a large visual indication of the corresponding letter, locating the desired longitudinal group would be greatly facilitated. Under these circumstances a motorized scan system for the search mode in the longitudinal direction is desirable, while the transverse scan can be accomplished manually in view of the relatively small number of transverse positions.

Since the magnetic readout or data entry operation also calls for the tape to be moved longitudially with respect to the read-write head, then the same motion mechanism may be employed in both the longitudinal search mode and the data readout or entry operation. In terms of longitudinal registration, all that is needed is a single registration hole for each longitudinal grouping. Once the appropriate longitudinal group has been positioned, the transverse address location can be accomplished either by manually moving the read-write head to a transverse position in alignment with the selected address or a parallel array of read-write heads may be employed and the head in alignment with the selected address may be selectively activated. For convenience, the tape motion during the search mode can be made to run at varying speeds including a maximum speed greatly in excess of the appropriate tape speed for the readout operation. A precisely controlled tape speed may then be used for the readout or entry of the magnetically stored data. Such a system provides for exceptionally fast location of the address. It should also be noted that with such a data storage system, each address can contain a very long line of stored data, since the length of the line is only limited by the desired intergroup spacing. Thus, in the extreme case where only one longitudinal address group is utilized, each address line could have data running the full length of the tape. Another advantage of such a system is that utilizing a parallel array of read-write heads several channels could be read out at the same time.

While there are a great variety of applications in which a data storage system, such as is herein described, may be employed, the following detailed description and drawings relate specifically to an automatic telephone dialing mechanism. The features of this invention are therefore described and discussed below in terms of the operation of the telephone dialer, but it will be understood that this is only for convenience of reference and the data storage system may be employed in any applications and devices utilizing a magnetically coated tape for data storage in which there is visual location of the appropriate address position.

Other objects and advantages will become apparent from the following detailed description when taken in conjunction with the accompanying drawings, in which:

FIG. 1 is an illustration in perspective view of an automatic telephone dialer including a data storage system constructed in accordance with the principles of this invention;

FIG. 2 is an illustration in perspective view of a magnetic tape cartridge for use in a data storage system constructed in accordance with the principles of this invention;

Figure 4:
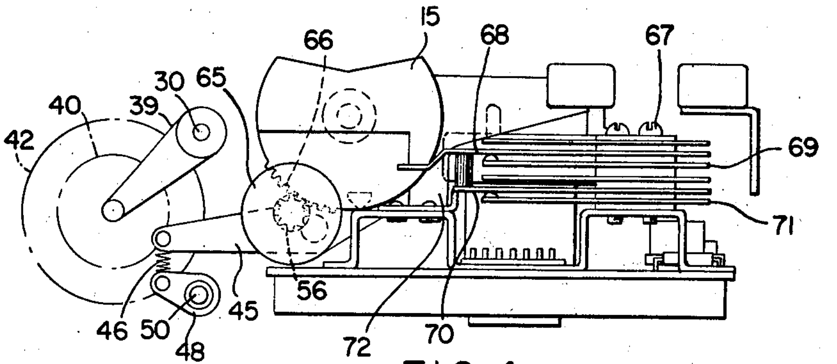
Figures 5, 6:
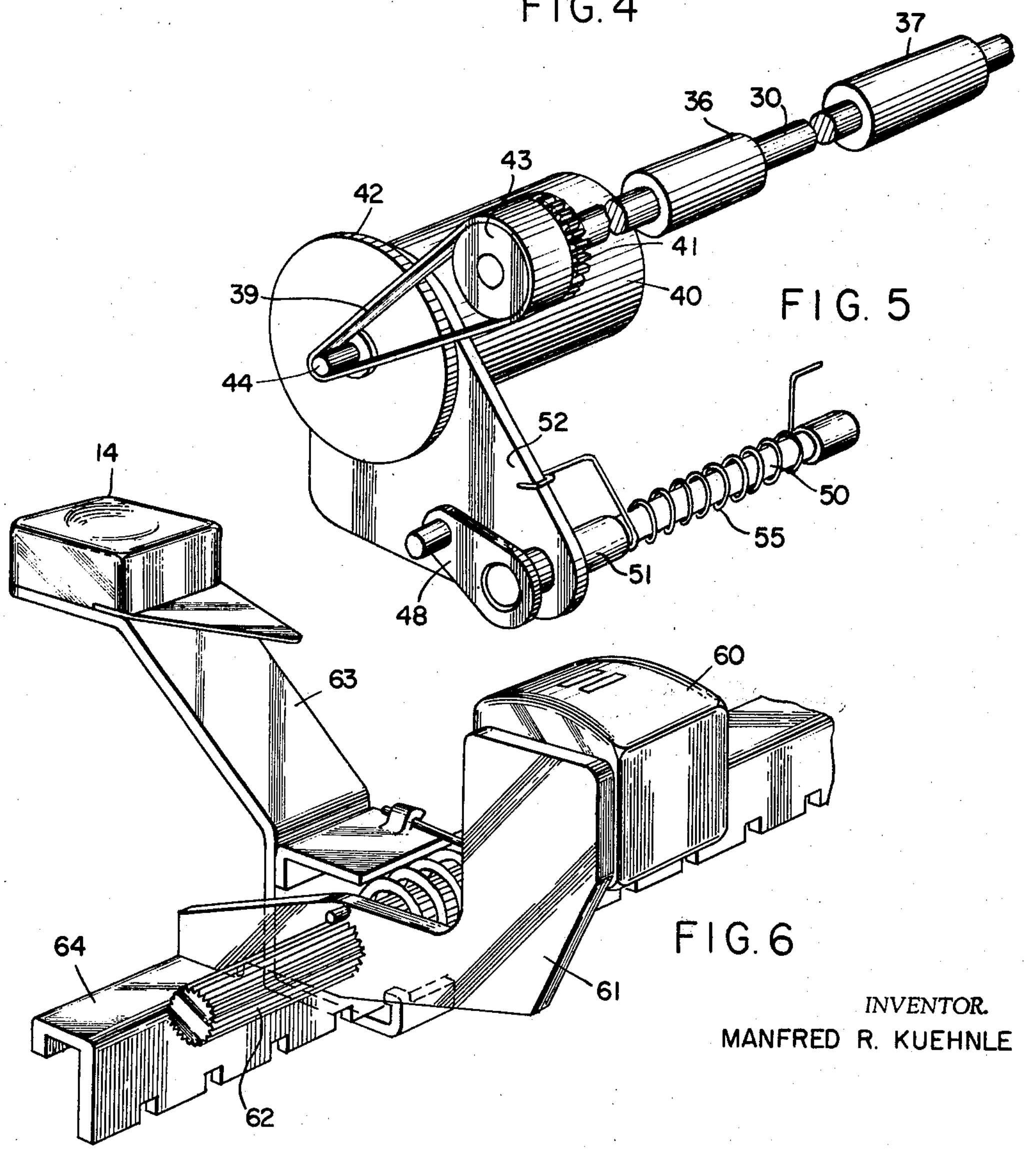
Figure 7:
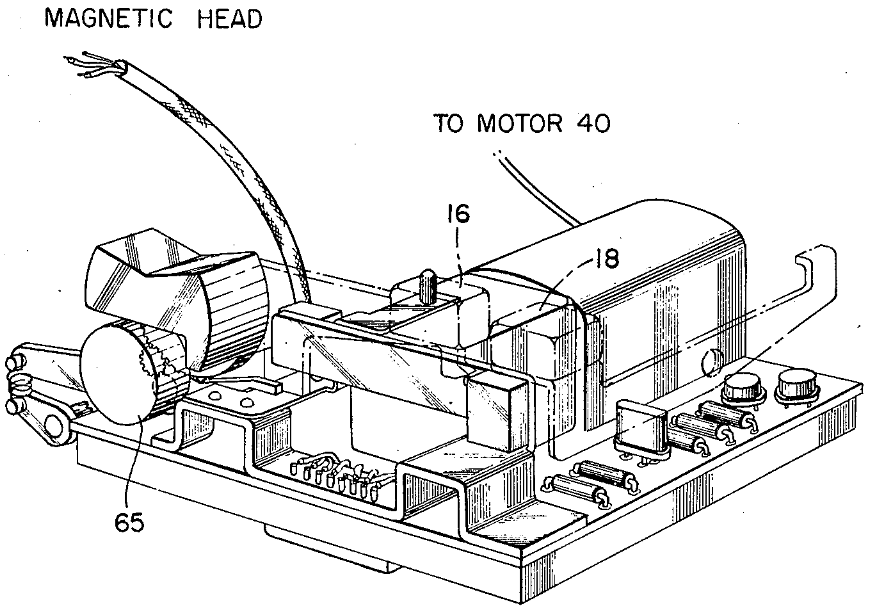
Figure 8:
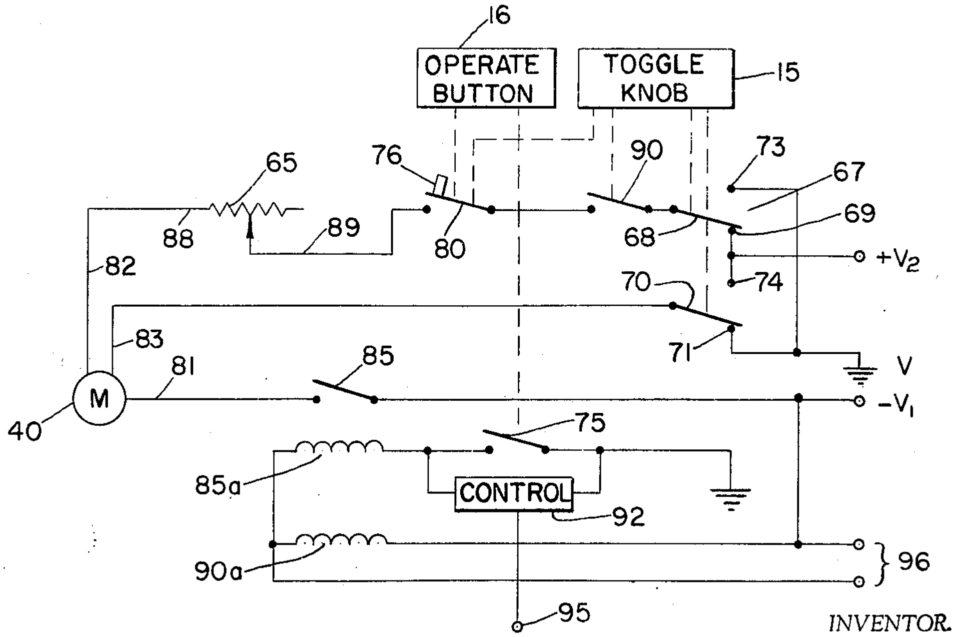

FIG. 2*a* is a detail view of an interlock on the supply roll of the cartridge of FIG. 2;

FIG. 3 is a cross-sectional view of the apparatus of FIG. 1 taken along the line 3—3 of FIG. 1;

FIG. 4 is an end view of a portion of the apparatus of FIG. 1 with the housing removed;

FIG. 5 is an illustration in perspective view of the details of the drive motor assembly for the system in apparatus in FIG. 1;

FIG. 6 is an illustration in perspective view of the detail of the read-write head mounting and transverse scanning mechanism;

FIG. 7 is an illustration in perspective view of the details of the control mechanism for the longitudinal search operation; and FIG. 8 is an illustration in schematic form of the circuit arrangements for the data storage system of FIG. 1.

As mentioned above briefly, for convenience of reference, the data storage system is described and shown in the figures in terms of an automatic telephone dialer system. In general, in this type of automatic telephone dialing, the telephone numbers are magnetically recorded on one side of the tape while the subscribers name is shown legibly on the reverse side of the tape and serves therefore as an indication of the position on the tape of the magnetically coded number. The subscribers names would be positioned in groups in alphabetic sequence along the tape and hence to locate the proper number the tape is scanned longitudinally until the correct alphabetic group position is found. The magnetic read-write head is then positioned transversely by means of an indicator button so that it is reading the correct line bearing the telephone number for the particular subscriber within the alphabetic grouping. An operate button is then pushed which causes the read-write head to read out the magnetically coded number, which is amplified through a suitable amplifier and applied to the telephone line as a dialing signal.

With reference now specifically to FIG. 1, the data storage system is shown incorporated in automatic telephone dialing equipment. A housing 11 has mounted within it a tape cartridge 10 which has in its upper surface a rectangular window 12 through which can be seen the tape surface which bears the identifying address information. As will be described more completely with reference to FIG. 2, the tape 13 is contained in the cartridge 10 which is inserted in the housing 11 and this cartridge contains both supply and take-up rolls for the tape. The longitudinal travel of the tape is from side to side in the device shown in FIG. 1. A transverse locating indicator 14 on the left side of the window 12 permits the reading head (which is located underneath the tape) to be positioned transversely across the tape in alignment with the selected transverse address position. A toggle control knob 15 controls the longitudinal movement of the tape during the scan operation for locating the longitudinal address position. By depressing one side of the toggle knob 15 the tape will travel from right to left, while depressing the opposite side of the control knob causes the tape to travel in the reverse direction. Once the proper longitudinal and transverse address has been selected, the information magnetically stored in the tape is read out by pushing the operate button 16 which, in a manner which will be explained in more detail below, causes the tape to move from right to left at a controlled speed across the activated magnetic head. An ejection button 18 located on the housing next to the operate button releases the latch holding the tape cartridge 10 in place for removal of this cartridge from the housing 11.

The overall data storage system then includes four separate, but interrelated, mechanisms: a magnetic tape cartridge, a drive mechanism for imparting longitudinal motion to the tape, a read-write head and transverse positioner for the read-write, and controls for both the search mode and the readout or data entry operation. Before discussing the manner in which these mechanisms cooperate to produce the overall function, each of the mechanisms will first be described as a unit.

In FIG. 2 the tape cartridge 10 is shown by itself. A cross-sectional view of this tape cartridge inserted into the housing 11 is shown in FIG. 3. It should be noted that the cartridge in the view of FIG. 2 has been turned around; so that the left-hand end as shown in FIG. 2 is the right-hand end as shown in FIG. 2 is the right-hand end when inserted into the housing. This view is shown in order to provide more detail of the transport roller arrangement. Referring to FIGS. 2 and 3, the cartridge is seen to consist of a plastic housing 20 having a snap-on top portion 21 with the window 12 for viewing the tape being cut out of the top portion 21. The window 12 may have a transparent cover, but more usually would be left open to facilitate writing on the surface of the tape 13. The top portion 21 of this housing is kept fastened to the lower portion 20 by means of a snap lock 22. Mounted in the lower portion 20 of this housing are three rollers; one roller being the tape supply spool 24, a second roller being the tape take-up spool 25, and the third roller being a rubber tape transport roller 26. The take-up roller 25 and the transport roller 26 are geared together with one gear having a slip clutch to allow for the variation in circumferential length which occurs during the take-up operation. The supply roller 24 contains an internal spring 23 which is arranged to wind the tape in the reverse direction from the take-up spool. When the cartridge 10 is in position in the housing 11, the supply spool 24 is not motor driven; rather, it is spring driven. The small knurled hand knob 28 allows the supply spool to be hand wound during the tape loading operation. At the end of the cartridge 10 adjacent the transport roller 26, are a pair of openings 29 in the housing 20, and when the cartridge is positioned in the overall housing 11, a pressure spindle 30 has two portions extending through these windows to squeeze the tape against the transport roller 26 for driving it longitudinally with rotation of the pressure spindle 30. The cartridge 10 is formed with a slot 32 running transversely across it to allow the read-write head to be positioned transversely. Next to this slot 32 the cartridge bottom has an elevated portion 33 which serves as a back-up pad so that the address information may be written on the upper side of the tape.

In order to load the tape 13 into the cartridge 10 the snap cover 21 is removed and one end of the tape 13 is inserted into a slot 34 in the take-up spool 25 and the remainder of the tape is then threaded underneath the rubber roller around past the windows 29 in the casing towards the supply spool 24. At the supply spool the other end of the tape is inserted into a slot 35 and the supply spool is wound up by hand by means of the knob 28. In FIG. 2*a*, the detail of a retaining lock assembly for the supply spool 24 is shown. When the cartridge 10 is removed from the housing this mechanism prevents the spring 23 from rewinding the tape onto the supply spool 24. The mechanism includes a square boss 19 fixed to roller 24 and this boss 19 is spring wound to extend into a square recess 27 in the cartridge casing 20. When the cartridge 10 is inserted into the overall housing 11, however, the knurled knob 28 is pressured inwardly; disengaging the boss 19 from the recess 27 and thereby allowing the tape position to be controlled by pressure spindle 30.

The cartridge 10 is removed from the casing 11 by depressing the ejection button 18; thereby prying up the end of casing 22.

The drive mechanism provides for transport of the tape in a longitudinal direction both for the search mode and for the operation mode. This mechanism is included within the overall housing 11 and is not specifically a part of the tape cartridge 10. The spindle 30 which has two increased diameter portions imparts this drive motion to the tape within the cartridge. The detail of the drive mechanism is shown in FIG. 5 as well as in the cross-sectional views of FIGS 3 and 4. Pressure spindle 30 is mounted in the casing 11 on pivot bearings so that it is free to rotate. A pair of increased diameter segments 36 and 37 respectively on the spindle protrude through the windows 29 in the cartridge casing 21 to squeeze the tape against the transport roller 26. The pressure spindle 30 is driven by a governed DC motor 40. On the output shaft of the motor 40 two speeds may be taken off, one for rapid winding of the tape during the search operation and a second one for a controlled slow speed scanning during the readout operation.

In the high speed arrangement the pressure spindle 30 is driven through a pair of gears 41 and 42 providing direct coupling for the output shaft of the motor. On the other hand during the slow scanning operation the pressure spindle 30 is driven through a belt 39 which couples a friction wheel 43 on the pressure spindle to a friction wheel 44 on the output shaft of the motor 40. The use of the belt drive for scanning during readout is particularly important in that it tends to eliminate flutter and "wow" in the data readout from the tape. The coupling between the pressure spindle 30 and the motor 40 is shifted from the fast to the slow speed by means of a mechanical linkage connected to the toggle control knob 15. This mechanical linkage includes a lever arm 45 mechanically coupled to the toggle knob such that depressing the toggle knob 15 in either direction pivots the lever 45 in a clockwise direction. The left-hand end of the lever arm 45 is connected through a spring 46 to a pivot arm 48 attached to one end of a pivot rod 50. Mounted on the pivot rod 50 and fixed to rotate with it is a bushing 51 to which is affixed a mounting plate 52 which supports the motor 40. Thus, clockwise rotation of the lever 45 results in clockwise rotation of the pivot arm 48 bringing the gear 42 on the output shaft of the motor into direct engagement with the gear 41 on the pressure spindle 30. On the other hand, when the lever arm 45 is returned to its normal position then the pivot arm 48 is moved counterclockwise by the action of its reset spring 55 and the pressure spindle 30 is now coupled to the motor 40 through the belt 39. As will appear more clearly from the discussion of the associated circuitry hereinafter, when in the scanning mode, not only does the coupling provide for higher speed of the pressure spindle 30 but also the governor on the motor 40 is deactivated thereby allowing the motor to run several times faster that the governed speed. It should be noted that when tape is travelling from right to left the rotation of the pressure spindle 30 is imparting the motion to the tape through rotation of the idler rollers 26 and the take-up spool 34. However, when the tape travel is in the reverse direction the spring within the supply spool 24 is actually supplying the motion while the rotation of the pressure spindle acts to remove an inhibiting force against this tape travel.

The read-write magnetic head and the transverse position assembly are shown in detail in FIG. 6 as well as in the cross sectional view of FIG. 3. The magnetic head 60 which may be any form of conventional read-write magnetic recording head is mounted on a support arm 61 which is in turn fixed to a pinion bar 62 and arranged to rotate with the pinion bar 62. A portion of the support arm 61 extends beyond the pinion bar and is attached to the arm member 63 on which is mounted the transverse position knob 14. The lower portion of this arm 63 rides on a transverse index bar 64 which has notches in it corresponding to the transverse line positions on the magnetic tape. When the search arm 63 is interlocked in one of the transverse slots in the transverse index bar 64, then the magnetic head 60 is in precise alignment with the respective magnetic coded portion at that transverse address position. The pinion bar 62 also extends through the lever arm 45 so that depression of the toggle knob in either direction rotates the magnetic head 60 away from the tape during the scan mode, thereby eleminating wear on the head or tape from this source.

The control mechanism for the longitudinal search mode is illustrated in detail in FIG. 7 and also shown in FIG. 4. In operation in the longitudinal scan mode, depression of the toggle knob 15 in one direction results in the rotation of the pressure spindle 30 at relatively high speed in one direction, while depression of the toggle knob 15 on the opposite side results in the relatively high speed rotation of the pressure spindle 30 in the opposite direction. An additional feature of this search mode is that the speed with which the tape is transported increases as the toggle knob is depressed further. Thus, by controlling the pressure with which the toggle knob 15 is depressed the speed of the search may also be controlled thereby facilitating high speed transport to the approximate vicinity of the address being sought, with a slower scan until the precise address is achieved. This varying speed is achieved by means of a rheostat 65 which controls the current supplied to the motor in the scan mode. This rheostat has a pinion 56 connecting it to a rack segment 66 on the lower arc of the toggle knob 15. Rotation of the toggle knob 15 varies the position of the rheostat, and therefore varies the current supplied to the motor 40.

Since the motor 40 runs in either of two directions the toggle knob 15 must control switching to reverse the polarity of the voltage applied to this motor. This is done through a wafer switch arrangement 67 which is electrically a double pole, double throw switch. This switch 67 is normally closed in its lower position, that is, with the upper center leaf 68 contacting the lower contact point 69, and the lower center leaf 70 contacting the lower contact point 71. The center leaf 68 of the upper segment of the switch 67 extends beneath a protruding portion of the toggle knob 15 and when the toggle knob is rotated in the clockwise direction, that is, depressing the right-hand side of the knob to transport the tape from right to left, then this center leaf continues to make contact with the lower contact point 69 of the same switch and the lower center leaf 70 continues to make contact with the lower contact point 71 of the lower portion of the switch. On the other hand, when the toggle knob 15 is rotated in a counterclockwise direction, driving the tape from left to right then the center leafs 68 and 70 are forced upward by the action of bias spring 72 and therefore making contact with the upper contact points 73 and 74 respectively of each portion of the switch.

In order to operate the longitudinal drive mechanism for the slow or controlled scan necessary for the readout operation the operate button 16 is depressed closing a microswitch 75. As will be seen more completely from the circuit description, closing of microswitch 75 provides for the motor 40 to drive the tape in a right to left-hand movement at the controlled or governed speed. In addition to closing microswitch 75, depression of the operate button 16 also removes the registration pin 76 from contact with a registration hole in the tape. The pin 76 controls the position of a microswitch 80 and this switch 80 is open only when the registration pin extends through a hole in the tape. Before the readout operation can commence the registration pin 76 must be in register, that is, extending through a perforation in the tape corresponding with the proper start read position for the selected longitudinal address. The circuitry of the longitudinal tape transport circuit control is such that the scan search mode only ends with the pin 76 is in registration with the longitudinal address perforation. Whenever a new scan search mode is initiated, depression of the toggle control knob 15 deflects arm 59 carrying the registration pin 76 thus removing the pin 76 from registration with the tape and closing the switch 80. The circuit is arranged such that when the toggle control knob is depressed in either direction, and subsequently released a minimum of current is supplied to the motor 40 through the switch 80 until a perforation is again in registry with the registration pin 76. At this point the pin 76 extends through the perforation in the tape, opening the switch 80 and halting the longitudinal search mode.

The circuit diagram for the longitudinal tape drive mechanism control is shown in FIG. 8. The direct current motor 40 has three input connections. One input connection 81 applies current to the motor coils through the governor while the remaining two connections 82 and 83 respectively provide current directly to the coils. The governor connection 81 of the motor is connected through normally open contacts 85 of relay **85*a* to a negative voltage supply indicated as $-V_1$. The motor contact lead 83 is connected to the center lead 70 of the lower segment of switch 67 directly. The motor contact 82 is connected to a fixed tap point 88 in rheostat 65. The wiper arm 89 of rheostat 65 is connected to one contact point of registration switch 80 while the second contact point of registration switch 80 is connected through normally closed contacts 90 of a relay 90*a* to the center leaf 68 of the upper portion of switch 67. The upper contact point 73 of the upper segment of switch 67 and the lower contact point 71 of the lower segment of switch 67 are both connected to electrical ground. The upper contact point 74 of the lower segment of the same switch and the lower contact point 69** of the upper segment switch are connected to a positive voltage supply $V_2$. The voltage at $V_2$ is generally larger than the voltage at $V_1$; typical values of these voltages being +31 and −12 volts respectively.

A microswitch 75 which is closed by depressing the operate button 16 has coupled across it a control element 92, which is actuated upon the closing of the microswitch 75 to provide a current bypass from the $V_1$ supply through the coils of relays **85*a* and 90*a* respectively. This control unit 92 is released by an external signal applied to contact 95. This external signal may either be in the form of a timer signal such that after a predetermined amount of time the control 92 opens thereby deactuating the coils of relays 85*a* and 90*a* or this signal may be supplied from a circuit responsive to the signals received by the read-write head 60 from the tape and be arranged to occur on an end of code indication. An additional external connector 96 is connected directly across the coils of relay 90*a* and through this connector 96 the relay 90*a*** is actuated by the programmer (not shown) during the data entry operation.

Having described the various separate mechanisms of this data storage system, the overall operation will now be discussed. In order to locate information stored under a specific title and read out this information the following procedure takes place. The operator depresses the toggle control knob 15 to drive the tape in a selected direction, the direction being determined by whether the appropriate visual address is to the right or to the left in the tape sequence. For example, if the longitudinal grouping at a particular time in the window 12 are subscribers grouped under the letter M and it is desired to dial a subscriber whose name begins with S, then the control knob 15 is depressed to drive the tape from right to left at relatively high speed until the approximate vicinity of the S longitudinal grouping. Depression of toggle knob 15 results in several roughly simultaneous actions taking place within the mechanism; the double pole double throw switch 67 is kept in its normal or downward position, the registration pin 76 is removed from a perforation in the tape and closes switch 80 and the wiper arm 89 of rheostat 65 is moved around to approximately the position of the permanent tap 88 (thereby providing maximum positive voltage to lead 82 of motor 40). As the S grouping is approached the operator may slow up the travel of the tape by releasing somewhat the pressure on the toggle knob 15 and thereby increasing the amount of resistance of rheostat 65 which is present between the wiper arm 89 and the permanent tap 88. When the longitudinal address being sought is generally within the window 12 the operator removes pressure from the toggle knob 15. Under these circumstances a minimum current is still supplied, however, to the motor lead 82 through normally closed contact 90, the closed registration switch 80 and the maximum resistance between the wiper arm 89 and the permanent tap 88 of rheostat 65. This causes the tape to drift slowly from left to right until the registration pin 76 is aligned with a perforation in the tape, at which point the registration switch 80 opens stopping the current flow to the motor 40. It should be pointed out that, no matter which direction the tape is driven by action of the toggle knob, the slow drift until the registration is achieved always takes place in the left to right direction.

When the direction of search is in the opposite direction and the toggle knob is depressed on the other side, then the center leaves 68 and 70 of switch 67 are raised into the upper position thereby connecting the positive potential of $V_2$ directly to the input lead 83 of motor 40 while the connection 82 of motor 40 is now connected through rheostat 65, registration switch 80 and normally closed contacts 90 to electrical ground. This reverses the direction of the motor and hence of the tape drive for this search mode.

When the search mode has been completed the registration pin 76 is in register with the selected longitudinal address, then the transverse position knob 14 is moved to the desired transverse address within this grouping. The read-write head 60 is now positioned correctly under the start of the coded information at this longitudinal and transverse address position.

In order to commence the read out operation itself, the operate button 16 is pushed resulting in the closing of microswitch 75. Closing of microswitch 75 then applies voltage from $-V_1$ across the coils of relays **85*a* and 90*a* thereby opening relay contacts 90 and closing relay contacts 85. At the same time the control unit 92 is actuated maintaining the relay contacts 85 closed until an external release signal is applied to connection 95. The closing of the contacts 85 of relay 85*a* applies the negative voltage from $-V_1$ directly onto the governor connection of motor 40 with return lead to ground being the connection 83 of motor 40. This control voltage then drives the tape from right to left at a controlled speed. Under these circumstances the motor is driving in the same direction as it would be for a left to right search mode scan, however, the spindle 30 is driven in the reverse direction since the coupling between the motor 40 and the spindle 30 is now formed of the belt 39 rather than the gears 41 and 42. At the conclusion of the reading process, as controlled either by an end of code signal or a fixed time signal, the control unit 92 opens thereby deactuating relays 85***a* and 90*a*. When relay 90*a* is deactuated, the contacts 90 are again closed and, since the registration pin is not extending through a perforation in the tape, switch 80 is also closed. Under these conditions, the minimum current is again applied to the motor 40 from ground through connection 82 to a positive voltage at $V_2$ through connection 83. Thus, the tape 13 now drifts slowly in the reverse direction from that of the readout scan until the perforation hole is once more in registration with the registration pin 76. At this point switch 80 opens and the tape has been returned to the initial address position which it held prior to the readout operations.

While there has been no description with respect to the electronic circuits for readout and entry of the magnetically coded data, it is apparent that conventional amplifier and switching techniques permit the signals received by the magnetic head to be read out as the tape is scanned in the readout operation across the head. In order to enter data the circuitry is reversed so that the magnetic impulses create the appropriate magnetic signals on the tape as it is scanned by the head. Under these circumstances, however, a signal is applied through connector 96 to actuate relay 90*a* thereby opening the contacts 90 so that the tape does not automatically reset to the initial registration of the address after a predetermined period of time but rather responds only to a signal introduced by the operator in the data entry process.

What is claimed is:

1. Data storage apparatus comprising an elongated storage medium having a first surface for storing magnetic signals and a second surface for displaying visual inscriptions, said first surface being disposed in fixed spaced relationship to said second surface; a magnetic read-write head disposed adjacent to said first surface;

a transport mechanism for moving said elongated storage medium along its longitudinal axis;

first control means for selectively operating said transport mechanism to move said medium along said axis in a first direction and in the opposite direction; second control means for actuating said transport mechanism to move said storage medium in said first direction only at a predetermined substantially constant speed while said read-write head is in operative juxtaposition to said first surface;

said transport mechanism including a reversible electric motor having an output shaft, a drive spindle, a first gear mounted on said output shaft, a second gear mounted on said spindle, a belt connecting said output shaft to said spindle such that during operation of said second control means said belt drives said spindle in conjunction with rotation of said output shaft;

and means responsive to operation of said first control means to engage said first and second gears and to disengage said belt during operation of said first control means.

2. Apparatus in accordance with claim 1 further including means for postioning said magnetic read-write head in operative juxtaposition to said first surface.

3. Apparatus in accordance with claim 1 wherein said first control means includes a toggle switch depressible to a manually operated degree, and a rheostat coupled to said toggle switch and operative in response to the degree of depression of the switch to vary the speed of said electric motor.

4. Apparatus in accordance with claim 1 and including a reset means operative at the conclusion of operation of said second control means to move said storage medium in said opposite direction for a distance equal to the amount said storage medium moved in said first direction during operation of said second control means, said reset means being arranged such that said belt drives said spindle during operation of said reset means.

5. Apparatus in accordance with claim 3 wherein said first control means includes a mechanical means for rotating said read and write head away from said first surface whenever said toggle switch is rotated in either direction.

6. Data storage apparatus comprising an elongated storage medium having a first surface for storing magnetic signals and a second surface for displaying visual inscriptions, said first surface being disposed in fixed spaced relationship to said second surface;

a magnetic read-write head disposed adjacent to said first surface;

a transport mechanism for moving said elongated storage medium along its longitudinal axis;

first control means for selectively operating said transport mechanism to move said medium along said axis in a first direction and in the opposite direction;

second control means for actuating said transport mechanism to move said storage medium in said first direction only at a predetermined substantially constant speed while said read-write head is in operative juxtaposition to said first surface, said magnetic recording and reading head being arranged to transmit or receive signals during said constant speed movement;

and means automaticaly operative at the conclusion of operation of said second control means to move said elongated storage medium in said opposite direction for a distance equal to the distance moved in said first direction during operation of said second control means.

7. Data storage apparatus comprising an elongated storage medium having a first surface for storing magnetic signals and a second surface for displaying visual inscriptions, said first surface being disposed in fixed spaced relationship to said second surface; a magnetic read-write head diposed adjacent to said first surface;

a transport mechanism for moving said elongated storage medium along its longitudinal axis;

first control means for selectively operating said transport mechanism to move said medium along said axis in a first direction and in the opposite direction; second control means for actuating said transport mechanism to move said storage medium in said first direction only at a predetermined substantially constant speed while said read-write head is in operative juxtaposition to said first surface;

said transport mechanism including a reversible electric motor having an output shaft, a drive spindle adapted to move said storage medium along its longitudinal axis, and a dual mode transmission mechanism for selectively driving said spindle, said transmission mechanism including gear means coupling said output shaft and said spindle in response to operation of said first control means, and belt means coupling said output shaft and said spindle in response to operation of said second control means.

8. Apparatus in accordance with claim 7 and including a transverse positioning means for positioning said magnetic read and write head at any one of a plurality of positions transverse of the longitudinal axis of said storage medium.

9. Apparatus in accordance with claim 8 and further including detent means at each of said transverse positions providing reproducibility of transverse positioning.

10. Data storage apparatus in accordance with claim 7 wherein said elongated storage means includes a series of registration indicia at spaced apart longitudinal positions on said storage medium and wherein said apparatus includes a registration mechanism having a registration element which, after operation of said first control means, must be in registration with one of said registration indicia before said storage medium will stop moving.

11. Data storage apparatus comprising an elongated storage medium having a plurality of data storage areas spaced longitudinally along it, each of said data storage areas having a first surface for storing magnetic signals and a second surface for displaying visual inscriptions, each of said data storage areas having a registration hole through said storage medium for locating the beginning of a series of stored data signals; a magnetic read-write head disposed adjacent to said storage medium; a transport mechanism for moving said elongated storage medium along its longitudinal axis in a first direction and in the opposite direction; a first control means manually operable to selectively actuate said transport mechanism to move said storage medium in either said first or said opposite direction; registration means including a registration pin, said registration means cooperating with said transport mechanism at the conclusion of each operation of said first control means to move said storage medium in said first direction only until said registration pin engages one of said registration holes; second control means for moving said storage medium only in said opposite direction at a predetermined substantially constant speed when said magnetic read-write head is in operative juxtaposition to one of said first surfaces.

12. Apparatus in accordance with claim 11 wherein said registration means acts at the conclusion of said second control means operation to move said storage medium again in said first direction until said registration pin is again in registration with the same registration hole it occupied at the commencement of operation of said second control means.

13. Apparatus in accordance with claim 11 wherein said storage medium is a tape wound on a pair of spools and contained within a cartridge, said cartridge being disposed in operative relationship with said transport mechanism.

14. Data storage apparatus comprising an elongated storage medium having a plurality of data storage areas spaced longitudinally along it, each of said data storage areas having a first surface for storing magnetic signals and a second surface for displaying visual inscriptions, each of said storage areas having a registration indicia in said storage medium for locating the beginning of a series of stored data signals;

a magnetic read-write head disposed adjacent to said storage medium;

a transport mechanism for moving said elongated storage medium along its longitudinal axis in a first direction and in the opposite direction;

first control means manually operable to selectively actuate said transport mechanism to move said storage medium in either said first or said opposite direction;

registration means including an element operatively associated with said registration indicia, said registration means cooperating with said transport mechanism at the conclusion of each operation of said first control means to move said storage medium in said first direction only until the element of said registration means aligns with one of said registration indicia; and second control means for moving said storage medium only in said opposite direction at a predetermined substantially constant speed when said magnetic read-write head is in operative juxtaposition to one of said first surfaces.

15. Data storage apparatus comprising a housing;

a cartridge removably positioned in said housing and having a supply roller and a take-up roller and a web of magnetic tape contained within said cartridge and wound around said supply and take-up rollers, said tape having a plurality of data storage areas spaced longitudinally along it, each of said data storage areas having a first surface for storing magnetic signals and a second surface for displaying visual inscriptions, said second surface being partially exposed through an opening in said cartridge, each of said data storage areas having a registration indicia for locating the beginning of a series of stored data signals;

a selectively reversible two speed transport mechanism operative in response to first and second predetermined settings of a first control switch to drive said tape at a first speed in a respective forward or reverse longitudinal direction, and operative in response to actuation of a second control switch to drive said tape at a second speed in a forward direction;

means including a reference element operative in response to a third predetermined setting of said first control switch to drive said tape until said registration indicia is aligned with said reference element;

a magnetic read-write head disposed adjacent the first surfaces of said magnetic tape, means connected to said read-write head and operative to position said head transversely of said tape in operative juxtaposition to one of said first surfaces, and means connecting said head to said first control switch, said last-mentioned means operative to move said head away from said first surfaces when said first control switch is in said first or second predetermined setting, and operative to move said head into operative juxtaposition with said first surfaces when said first control switch is in its third predetermined setting.

16. Apparatus in accordance with claim 15 wherein said supply roller is spring-loaded to urge said roller toward rotation in a first direction.

17. Apparatus in accordance with claim 16 and including means for inhibiting motion of said supply roller except when said cartridge is properly positioned in said housing.

18. For use in an automatic telephone dialing system including drive means operative to selectively drive a magnetic tape in a forward direction or a reverse direction until a selected area of said tape is present, and then operative to drive the selected area of said tape in a forward direction past a magnetic read-write head;

a removable tape cartridge comprising a cartridge casing; a supply roller and a take-up roller, each having a greater axial length than its diameter, said rollers being rotatably disposed in respective opposite ends of said casing; a magnetic tape having a first surface for storing magnetic data and a second surface for displaying visual inscriptions, said tape being wound around said supply and take-up rollers with said second surface confronting a first wall of said casing having an opening therein for exposing a portion of said second surface;

said casing having a wall portion disposed closely adjacent to the opening in said first wall and confronting the first surface of said tape to provide a backing to facilitate writing inscriptions on the second surface of the tape;

and a transport roller positioned in the same end of said casing as said take-up roller and having a circumferential portion exposed through an opening in said same end of said casing, said transport roller being coupled to said take-up roller and operative to rotate said take-up roller in response to a rotational force applied to the exposed circumferential portion of said transport roller.

19. Apparatus in accordance with claim 18 wherein said cartridge further includes spring means contained within and coupled to said supply roller and operative to exert a rotational force in one direction only on said supply roller thereby to urge said tape toward said supply roller in the absence of a driving force on said take-up roller;

and means contained within said supply roller to inhibit rotation of said supply roller when said cartridge is removed from the dialing system.

20. Apparatus in accordance with claim 19 wherein said cartridge further includes a second wall confronting said first surface and having an opening extending transversely across the width of said tape, said opening being adapted to accommodate a magnetic read-write head in operative juxtaposition to said first surface.

References Cited

UNITED STATES PATENTS

| | | | |
|---|---|---|---|
| 2,900,132 | 8/1959 | Burns | 179—100.25 X |
| 2,951,914 | 8/1960 | Pubois | 179—100.2 |
| 3,104,287 | 9/1963 | Kobler | 179—90.2 |
| 3,254,162 | 5/1966 | Miller | 179—90 |

BERNARD KONICK, Primary Examiner

V. P. CANNEY, Assistant Examiner

U.S. Cl. X.R.

179—90

UNITED STATES PATENT OFFICE

CERTIFICATE OF CORRECTION

Patent No. 3,495,229 Dated February 10, 1970

Inventor(s) Manfred R. Kuehnle

It is certified that error appears in the above-identified patent and that said Letters Patent are hereby corrected as shown below:

Column 1, line 65, delete "one" and substitute --on--;

Column 4, line 19, after "read-write" insert --head--;

lines 29 and 30, delete "as shown in FIG. 2 is the right-hand end";

Column 9, line 66, delete "operated" and substitute --selected--.

SIGNED AND SEALED

SEP 8 - 1970

(SEAL)

Attest:

Edward M. Fletcher, Jr.

Attesting Officer

WILLIAM E. SCHUYLER, JR.

Commissioner of Patents

FORM PO-1050 (10-69)

USCOMM-DC 60376-P69

☆ U.S. GOVERNMENT PRINTING OFFICE : 1969 O—366-334